United States Patent Office 2,788,319
Patented Apr. 9, 1957

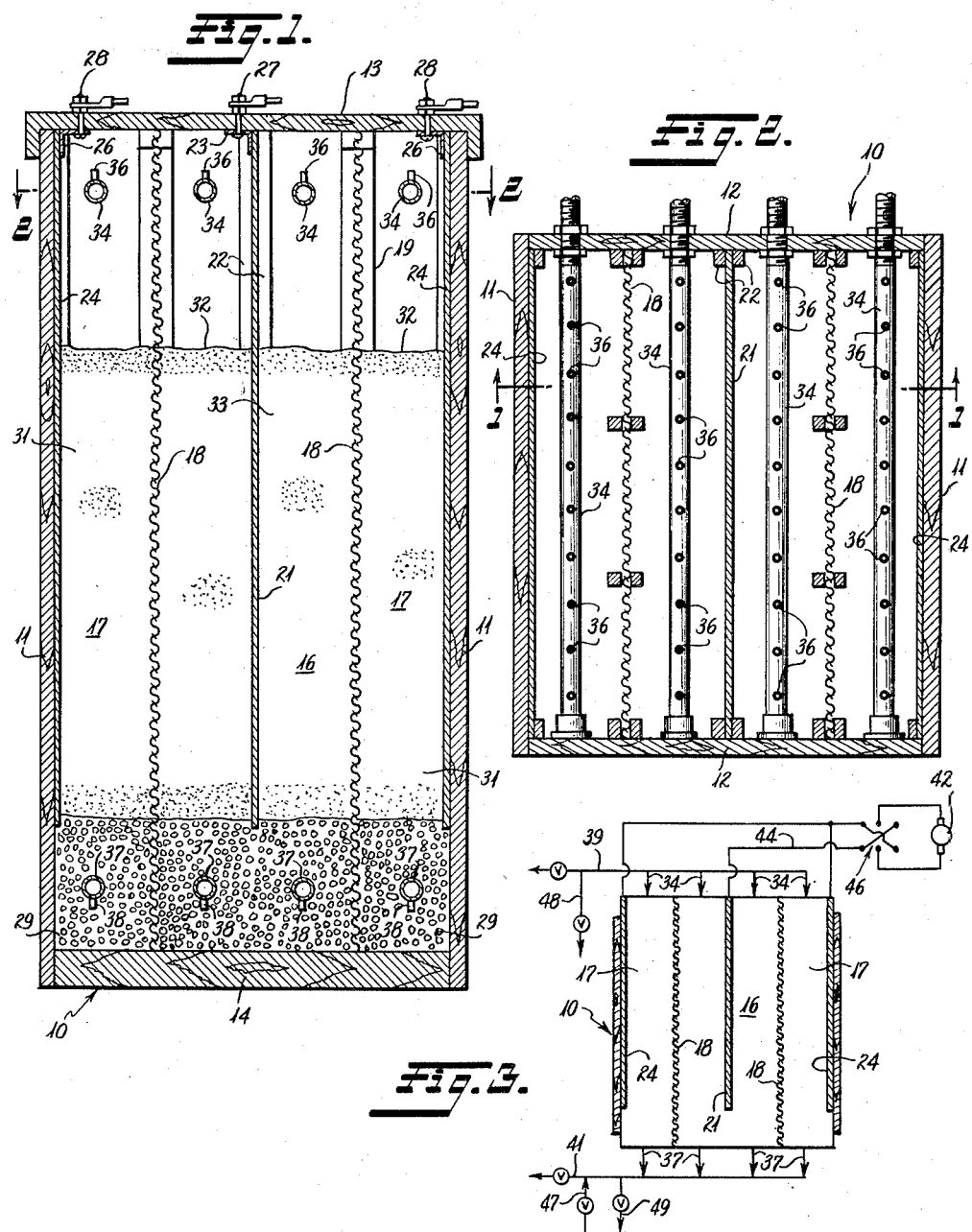

2,788,319

ION EXCHANGE METHOD AND APPARATUS

Ralph G. Pearson, Chicago, Ill., assignor to Clayton Manufacturing Company, El Monte, Calif., a corporation of California Application February 7, 1956, Serial No. 563,870

10 Claims. (Cl. 204—151)

This invention relates to ion exchange methods and apparatus, and, more particularly, to a process and apparatus in which electrolytes are removed from solution in solvents in which they ionize by a combined electrolytic and ion exchange operation and in which the employment of acid and alkali regenerating solutions for the ion exchange material is eliminated.

Ion exchange materials are well-known in the art. They include ion exchange resins of both the anion and cation exchange type. Such ion exchange resins have been extensively employed for removing electrolytes from water in operations known as desalting, demineralization or deionization. The latter term will be employed in this application as generic to the removal of electrolytes from solutions in which they ionize. In conventional deionizing operations, the water is flowed through either a mixed bed of the two types of resins or through separate beds of the resins in series. Cation exchange resins are essentially acidic, synthetic resins polymerized to a state in which they are water-insoluble but are water-permeable. The cation exchange resins in their active state are in fact solid, water-insoluble, water-permeable, organic acids, and when placed in water they ionize to provide a large number of replaceable hydrogen cations dispersed through the resins. Similarly, anion exchange resins in their active form are basic synthetic resins and are in fact solid, water-insoluble, water-permeable, organic bases which ionize when placed in water to provide a large number of replaceable hydroxyl anions. When a water containing an electrolyte in solution is flowed through a cation exchange resin, the hydrogen cations of the resin are replaced by any cations such as sodium, magnesium or calcium present in the water, and an acid water is discharged. When this acid water is flowed through an anion exchange resin, the hydroxyl anions thereof are replaced by any anions such as chlorine or sulfate anions present in the water, and a substantially neutral water may be discharged. Mixed beds of resins may be employed and also the water may first be flowed through a bed of anion exchange resin and then through a bed of cation exchange resin.

When the resins are substantially completely exhausted by replacement of their hydrogen cations and hydroxyl anions with other ions, the flow of water is stopped and in conventional practice the resins are first backwashed to loosen the beds and remove any solid materials which may have filtered from the water. The resins are then regenerated. The cation exchange resins are regenerated with an acid solution so as to replace the other cations present therein with hydrogen cations, and the anion exchange resins are regenerated with an alkaline solution such as sodium hydroxide so as to replace the other anions therein with hydroxyl anions. The resins are then rinsed to remove residual regenerating solutions and are again ready for employment in deionization. In mixed bed operations, the two types of resins are separated prior to regeneration. Duplicate exchangers are ordinarily employed so that one set of exchangers can be used for deionization while the other set is being backwashed, regenerated and rinsed.

In accordance with the present invention, adjacent beds of particles of cation and anion exchange materials separated by a permeable diaphragm are employed with electrodes in contact with the beds of ion exchange materials. The water to be deionized is flowed in parallel through the beds. Any cations in the water entering the bed of cation exchange material replace hydrogen cations therein, and any anions in the water entering the bed of anion exchange material replace hydroxyl anions therein. An electric, direct current potential is applied between the electrodes to make the electrode in contact with the cation exchange material a cathode and the electrode in contact with the anion exchange material an anode. Any cations present in the water entering the bed of anion exchange material are caused to migrate toward the cathode and through the diaphragm into the cation exchange material to also replace hydrogen cations therein. Similarly, any anions present in the water entering the bed of cation exchange material are caused to migrate into the anion exchange material to also replace hydroxyl anions therein. Anions produced at the cathode have no effect on the cation exchange material adjacent thereto and, similarly, cations produced at the anode have no effect on the anion exchange material adjacent thereto. After the ion exchange materials are exhausted the flow of water is decreased and the polarity of the electrodes reversed. Hydrogen cations are then produced at the electrode (now the anode) adjacent the cation exchange material so as to replace cations in this material and cause them to migrate through the diaphragm into the anion exchange material. Similarly, hydroxyl anions are produced at the electrode (now the cathode) adjacent the anion exchange material so as to replace anions in this material and cause them to migrate into the cation exchange material. The cations thus carried into the anion exchange material and the anions thus carried into the cation exchange material cannot replace other ions therein and are carried out of the apparatus by flow of water during the regeneration operation. The two beds of ion exchange material are thus regenerated without the employment of acid and alkali regenerating solutions, and a relatively concentrated solution of the original electrolyte is discharged. The same principles are applicable to any solution of an electrolyte in a solvent in which it ionizes.

It is therefore an object of the present invention to provide an improved process and apparatus in which a solution of electrolyte in water or other solvent in which it ionizes is subjected to a combined electrolytic and ion exchange treatment to remove electrolyte from the solution.

Another object of the invention is to provide a process and apparatus in which a solution of an electrolyte in water or other ionizing solvent is flowed through parallel beds of cation and anion exchange materials while an electric current is passed through the beds between a cathode adjacent the bed of cation exchange material and an anode adjacent the bed of anion exchange material so as to remove electrolyte from the solution and the ion exchange materials are then regenerated by decreasing the flow of solution and reversing the polarity of the electrodes.

Other objects and advantages of the invention will appear in the following detailed description of the apparatus shown in the accompanying drawing, of which:

Fig. 1 is a vertical cross-section through a deionizing chamber taken on the line 1—1 of Fig. 2;

Fig. 2 is a horizontal cross-section taken on the line 2—2 of Fig. 1; and

Fig. 3 is a schematic diagram indicating the flow of solutions in the process and the electrical connections.

Referring more particularly to the drawings, the deionizing chamber 10 may include end walls 11 and side walls 12 and top and bottom walls 13 and 14, respectively. The chamber may be divided into a central anion exchange compartment 16 and two cation exchange compartments 17 by permeable diaphragms 18 which may be made of any suitable material which is readily wetted but which prevents the rapid flow of water therethrough. A suitable material is heavy canvas or other tightly woven fabric such as fabrics of various synthetic fibers which are resistant to acids and alkalis. Plates or sheets of porous ceramic or other materials may also be employed. The diaphragm 18 may be held in position by suitable framework including bracing members 19. A central electrode 21 may be supported centrally of the anion exchange compartment, for example, by guide members 22 secured to the side walls 12 and by a bus bar 23 secured to the electrode and to the top member 13. Similar electrodes 24 may be supported in the cation exchange compartment 17 adjacent the end walls 11 and secured to bus bars 26. As shown in Fig. 1 the bus bars 23 have electrical connections 27 extending through the top wall 13, and the bus bars 26 have electrical connectors 28 also extending through the top wall 13.

The exchange compartments 16 and 17 may be partly filled at their lower portions with a graded aggregate 29 as is known in the art, and the cation exchange compartments 17 may also be filled above the graded aggregate with beds 31 of cation exchange material up to the level 32, leaving a substantial space above the cation exchange material. Similarly, the anion exchange compartment 16 may be filled with a bed 33 of anion exchange material up to the level 32. It will be noted that the bed 33 of anion exchange material is in contact with the electrode 21 at a position spaced from the diaphragms 18 and that the beds 31 of cation exchange material are in contact with the electrodes 24 at positions spaced from the diaphragms 18. Distributor pipes 34 may extend across the upper portions of the anion and cation exchange compartments. These pipes may extend through a side wall 12 and be provided with upwardly extending nozzles 36 within the compartments. Similar pipes 37 provided with downwardly extending nozzles 38 may extend across the lower portions of the cation and anion exchange compartments so as to be buried in the graded aggregate 29.

As indicated in Fig. 3, the pipes 34 may be connected to a common pipe 39, and the pipes 37 may be connected to a common pipe 41. The arrowheads on the pipes 34 and 37 indicate the direction of flow of the solution to be deionized. That is to say, water to be deionized may be flowed in parallel through both the anion exchange compartment 16 and the cation exchange compartments 17. The cation exchange resin in the cation exchange compartment 17 is assumed to be in active form, i. e., to have a large number of replaceable hydrogen cations therein, and the anion exchange resin in the compartment 16 is assumed to have a large number of replaceable hydroxyl anions. During the deionization treatment, the electrodes 24 in contact with the cation exchange material are made cathodes, and the electrode 21 in contact with the anion exchange material is made an anode. That is to say, the electrodes 24 may be connected to a source of direct-current electric power shown as a generator 42 through a conductor 43, and the electrode 21 may be connected to the generator 42 through a conductor 44. A reversing switch is indicated at 46 for reversing the polarity of the electrodes 21 and 24 during the regenerating operation later described.

It is convenient to discuss a specific electrolyte solution, and for this purpose a solution of sodium sulfate in water may be selected. In the cation exchange compartment 17, sodium cations introduced with the water into the cation exchange material will replace hydrogen cations in the cation exchange material. Sulfate anions are also present in the water introduced into the compartments 17 containing cation exchange material. They cannot replace ions in such material, and since the electrodes 24 are cathodes and the electrode 21 is an anode, these anions migrate through the diaphragms 18 into the anion exchange material therein. In a similar manner, sulfate anions introduced with water from the pipes 34 into the anion exchange compartment 16 also replace hydroxyl anions on the anion exchange material therein. Sodium cations are also introduced into the compartment 16 with water supplied thereto, but these cations migrate through the diaphragm 18 into the cation exchange compartment 17 to also replace hydrogen cations on the cation exchange material therein. Thus both sodium cations and sulfate anions are retained by the ion exchange materials such that the water substantially denuded of electrolyte is discharged through the pipes 37 and may be discharged from the process through pipe 41. The replaced hydrogen cations migrate to the cathode and are discharged to liberate hydrogen and the replaced hydroxyl anions migrate to the anode to liberate oxygen.

Any sulfate anions reaching the electrode 21, which is anode during the deionizing treatment, are discharged and react with the water to produce hydrogen cations, and these hydrogen cations also migrate toward the electrodes 24 and react with replaced hydroxyl anions to form water but cannot replace anions in the anion exchange material in the compartment 16. Hydroxyl anions are also produced at the electrodes 24 by electrolytic action on any sodium cations reaching these electrodes and these hydroxyl anions migrate toward the electrode 21. They react with replaced hydrogen cations to form water but cannot replace cations in the cation exchange material in the compartment 17. As the resins approach exhaustion the number of replaced hydrogen cations and replaced hydroxyl anions in the resin beds decreases and the hydrogen cations from the electrode 21 begin to meet the hydroxyl anions from the electrode 24 in the vicinity of the diaphragm 18. They combine to form water so that large numbers of hydrogen cations do not enter the cation exchange compartment 17, and, similarly, large numbers of hydroxyl anions from the electrode 24 do not enter the anion exchange compartment 16 during the deionization step. However, as the resins become exhausted, a large part of the current between the electrodes begins to be carried by hydrogen cations from the electrode 21 and hydroxyl anions from the electrode 24 instead of being carried by sodium cations and by sulfate anions through the diaphragms 18. This current produces no useful result in the deionization step and because of this current, the efficiency of the process rapidly decreases as the ion exchange materials approach exhaustion. This is the limiting factor as to the extent to which the ion exchange materials may be economically exhausted.

When substantial amounts of sodium cations and sulfate anions begin to appear in the water discharged from the pipe 41, the exchange materials must be regenerated. The flow of water through the chambers may then be discontinued. It is usually desirable to backwash the resin beds prior to regeneration, and this may be carried out by introducing backwash water through the pipe 47 and discharging it to waste through the pipe 48.

After backwashing the resins may be regenerated by reversing the polarity of the electrodes and slowly flowing water downwardly through the compartments, i. e., introducing water through the pipe 39 and discharging it to waste through a pipe 49. If no backwashing is employed, it is merely necessary to reduce the flow of water downwardly through the compartments and discharge such water to waste. The reversal of the polarity of the electrodes makes the electrode 24 adjacent the cation exchange material an anode, and the electrode 21 adjacent the anion exchange material a cathode. Hydroxyl anions are now produced at the electrode 21 by electrolytic action and tend to migrate toward the electrode 24. They, however, replace sulfate anions in the anion exchange material 16, and these replaced anions are either washed out of compartment 16 or migrate through the diaphragms 18 into the cation exchange compartment 17. They cannot replace ions in the cation exchange material and are washed from the compartment 17. In a similar manner, hydrogen cations are now produced by electrolytic action at the electrodes 24 to replace sodium cations in the cation exchange material in the compartment 17. The replaced sodium cations are either washed out of the compartment 17 or migrate into the anion exchange compartment 16. They cannot replace ions in the anion exchange material therein and are washed out of the anion exchange compartment. The hydrogen cations produced at the electrode 21 also tend to migrate toward electrode 24, and the hydroxyl anions produced at the electrode 24 tend to migrate toward the electrode 21. The hydrogen cations and the hydroxyl anions meet in the vicinity of the diaphragms 18 and combine to form water. As the exchange materials are regenerated and approach their active forms, an increasingly greater amount of the current between the electrodes is carried by hydrogen cations and hydroxyl anions. This current serves to useful purpose in regeneration of the ion exchange material. Although theoretically the exchange materials can be completely regenerated, the amount of wasted current carried by the hydroxyl anions and hydrogen cations places a practical limitation upon the degree of regeneration which can be obtained.

After the regenerating operation, the source of power may be disconnected from the electrodes and the ion exchange materials rinsed by continuing to introduce water through the pipe 39 and discharging it through the pipe 49. After the rinsing operation the electric power can be again applied to the electrodes to make the electrodes 24 cathodes and the electrode 21 an anode. Water may be continued to be introduced through the pipe 39 and discharged through the pipe 41, the discharged water being substantially free of electrolyte. It will thus be seen that the present process and apparatus eliminates the necessity of purchasing and supplying regenerating solutions to the ion exchange operation and that the electric current is not only employed for regeneration of the resins but also assists in the demineralization operation.

While the specific description of the invention has been directed to the treatment of a water solution of sodium sulfate, it should be apparent that substantially any solution of electrolyte including acid and alkali solutions in substantially any solvent in which the electrolyte will ionize may be treated in accordance with the principles of the present invention. Thus, for example, calcium and magnesium cations as well as chloride or other anions can be removed from water or other polar solvent.

As stated above, ion exchange materials including ion exchange resins are well-known in the art and need not be further described. They are available in particle form either in the form of granules or small spheres so as to provide a bed through which water or other liquid will readily flow. The present process can employ substantially any type of cation exchange material operating on the hydrogen cycle and substantially any type of anion exchange material including weakly acidic cation exchange material and weakly alkaline anion exchange material.

Also an apparatus containing two cation exchange compartments and a single larger anion exchange compartment has been selected as an illustration, but it is apparent that a single anion exchange compartment and a single cation exchange compartment can be employed or that a plurality of both types of compartments can be employed. Duplicate treating apparatus can also employed so that one may be used for deionization while the other is being regenerated.

When water or other polar solvent containing substantial amounts of polyvalent metal cations such as calcium or magnesium cations as well as alkali metal cations is being treated, the pH adjacent the cathode in either the deionization or regenerating step may become sufficiently high to precipitate compounds of such polyvalent metals insoluble in the alkaline solution. While these precipitates may usually be removed by backwashing, it is sometimes advantageous to first soften the water to remove cations of such polyvalent metals prior to the deionization treatment of the present invention. Such softening may, for example, be accomplished by electrolytic treatment of the water in the cathode compartment of a two-compartment electrolytic cell as disclosed in the patents to Briggs 2,535,035 granted December 26, 1950 or No. 2,546,254 granted March 27, 1951, or by cation exchange treatment in an exchanger employing zeolites. The softening treatment in the Briggs cells has the advantage that, in addition to softening, the total electrolyte content of the water is reduced while in the zeolite treatment polyvalent metal cations are merely exchanged for sodium cations.

EXAMPLE

A two-compartment electrolytic cell was constructed of polymethyl methacrylate with a Dynel cloth separator between the compartments. The compartments were of equal dimensions, each being approximately 13 cm. high by 6 cm. wide by 3.5 cm. deep. Each compartment was provided with a graphite electrode. All electrolyses were carried out at 6 volts. The electrolyte utilized for both regeneration and demineralization was sodium chloride solution having a concentration of 3000 p. p. m. NaCl. The resins used were Rohm & Haas IR–120 (cationic) and Rohm & Haas IRA–400 (anionic). The resins, IR–120 and IRA–400, were initially exhausted into the sodium and chloride forms, respectively, by treatment with 2 percent sodium chloride solution. They were then washed free of sodium chloride. The resins were then packed into the electrolytic cell as adjacent beds separated only by the Dynel cloth. Such quantities of resins were used that the levels of both resins in the cell were equal. A solution containing 3000 p. p. m. sodium chloride was added to the resin bed in each compartment in such volume as to just cover the top of the resin beds. In the first electrolytic operation, regeneration of the adjacent resin beds was carried out at 6 volts. The electrode in the cationic resin bed was made positive (anode) so that hydrogen ions from the acid produced would regenerate the sodium-exhausted resin. The electrode in the anionic resin body was made negative (cathode) so that the hydroxyl ions from the base produced here would regenerate the chloride-exhausted resin. The cell set-up at the beginning of this regeneration step is illustrated in the following diagram:

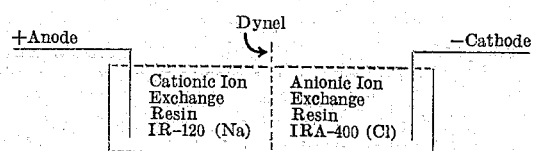

After the electrolytic regeneration had been carried out for 21.5 hours at an average current of 1.10 amps., current flow was stopped, and samples of each resin were removed for analysis to determine the regeneration efficiency. A weighed portion of each of the regenerated resins was treated with 50 ml. of 20 percent sodium chloride solution, and the resulting solutions were then titrated with standard base and acid respectively to determine the hydrogen ion and hydroxyl ion content. It was found by such analysis that the cationic resin IR-120 had been regenerated to the extent of 82.5 percent with an electrical regeneration efficiency of 44.4 percent. The anionic resin IRA-400 was found to be regenerated to the extent of 49.3 percent with an electrical regeneration efficiency of 11 percent.

Electrolytic demineralization was now accomplished by reversing the polarity of the electrical connections to the cell so that the electrode in the cationic resin IR-120 was made negative (cathode), and the electrode in the anionic resin IRA-400 was made positive (anode). Through each compartment, separate solutions of 3000 p. p. m. sodium chloride were flowed in parallel at the rate of 25 ml. per hour. The magnitude of the current was adjusted to such a value that with the flow rate of 25 ml. per hour 100 percent demineralization should theoretically occur. The average current was 0.069 amp. The cell set-up for demineralization is illustrated as follows:

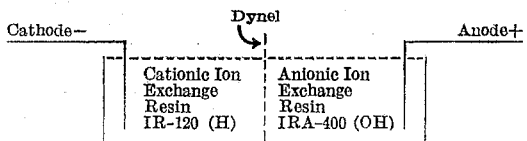

Samples were taken for analysis at the end of an eight-hour flow period. The effluent from the cationic resin was acidic and the effluent from the anionic resin was basic. Volumes of the effluents from the anionic resin bed and from the cationic resin bed were mixed, and provided a substantially neutral solution. The resulting solution was analyzed for chloride (NaCl) by Mohr's method of titration with 0.1 normal silver nitrate solution. The degree of demineralization was found to be 55 percent. The concentration of the demineralized combined effluents from the cell was 1350 p. p. m. NaCl.

At this point of the process, a small sample of each of the resins was removed from the cell and analyzed to determine the degree of exhaustion. It was found that the cationic resin IR-120 still retained approximately 59.9 percent of the resin in active form, and that the anionic material IRA-400 still retained approximately 34.4 percent in active form. The resin beds were then again electrolytically regenerated by reversing the polarity of the current in the manner described above with respect to the first regeneration step. Both resin beds were washed free of electrolyte (sodium chloride, acid, and base) and a solution of 3000 p. p. m. sodium chloride was added to the resin bed in each compartment so that the level of solution was approximately equal in height to the level in the resin beds. Electrolytic regeneration was carried out for a duration of five hours at 6 volts and with an average current of 0.94 amp. Analysis of the re-regenerated cationic resin IR-120 showed 73.6 percent of the resin to be in active form. The regeneration efficiency was 36 percent. Analysis of the re-regenerated anionic resin IRA-400 showed 45 percent of the resin to be in active form. The electrical regeneration efficiency was 11.5 percent.

Demineralization without electrolysis was conducted so that comparison of the efficiency thereof with the efficiency of demineralization during the electrolytic process could be made. Accordingly, separate solutions of 3000 p. p. m. sodium chloride were flowed at a rate of 25 ml. per hour through regenerated resin beds in the electrolytic cell in exactly the same manner as was done during the electrolytic demineralization step, except that there was no current flow between the electrodes. The resins at the beginning of such flow were in regenerated condition with cationic exchange resin IR-120 being in the hydrogen form, and the anionic resin IRA-400 being in the hydroxyl form. Analysis of the resulting effluent determined the degree of demineralization by such process to be 30.6 percent with the concentration of the combined effluents (demineralized water) being 2082 p. p. m. NaCl. It is to be noted that this technique of demineralization, i. e. parallel flow of solutions through the resin beds without electrolysis, would result in only 50 percent demineralization if the demineralization process were 100 percent efficient. The effect of electrolysis during the demineralization operation resulted in actual demineralization of 55 percent due to the migration of sodium ions from the anode compartment toward the cathode for replacement of hydrogen ions in the cation exchange resin, and migration of chloride ions from the cathode compartment toward the anode for replacement of hydroxyl ions in the anion exchange resin. A summary of the results of the foregoing example is given as follows:

A. *Regeneration process*

|  | Cationic Resin IR-120 | | Anionic Resin IRA-400 | |
| --- | --- | --- | --- | --- |
|  | Degree of Regeneration | Regeneration Efficiency | Degree of Regeneration | Regeneration Efficiency |
|  | Percent | Percent | Percent | Percent |
| (1) | 82.5 | 44.4 | 49.3 | 11.0 |
| (2) | 73.6 | 36.0 | 45.0 | 11.5 |

(Data on line (1) are for the initial regeneration, and on line (2) for regeneration after the demineralization process.)

B. *Demineralization process.*—(*Water initially containing 3000 p. p. m. NaCl*)

|  | Without Electrical Potential | With Electrical Potential |
| --- | --- | --- |
| Degree of demineralization___percent__ | 30.6 | 55.0 |
| Concentration of Demineralized Water (NaCl)___p. p. m.__ | 2,082 | 1,350 |
| Electrical efficiency___percent__ |  | 55.0 |

In practice, the volumes of the two resin compartments may be made unequal. For example, the anionic resin (IRA-400) has approximately half the exchange capacity of the cationic resin (IR-120), and in order to have the same total capacity, the volume of the anionic resin may be about twice that of the cationic resin. If the heights of the resin beds are to be equal, the depth of the anionic resin bed may be twice that of the cationic resin bed. The volumes of the resin compartments may thus be adjusted depending on the capacities of the particular resins used.

This application is a continuation-in-part of my co-pending application Serial Number 286,409 filed on May 6, 1952, now abandoned.

I claim:

1. The process of removing an electrolyte from a solution thereof in a solvent in which it ionizes, which comprises, flowing portions of said solution in parallel through adjacent beds of particles of active anion exchange material and active cation exchange material separated by a permeable diaphragm, and passing a direct current from a first electrode adjacent said bed of anion exchange material first through said bed of anion exchange material and then through said bed of cation exchange material to a second electrode adjacent said bed of cation exchange material so that said first electrode is an anode and said second electrode is a cathode, whereby anions entering said bed of cation exchange material with said solution migrate into said bed of anion exchange material and along with anions entering said bed of anion exchange material with said solution replace hydroxyl anions in said bed of anion exchange material and cations entering said bed of anion exchange material with said solution migrate into said bed of cation exchange material and along with cations entering said bed of cation exchange material with said solution replace hydrogen cations in said bed of cation exchange material.

2. The process of removing an electrolyte from a solution thereof in a solvent in which it ionizes, which comprises, flowing portions of said solution in parallel through adjacent beds of particles of active anion exchange material and active cation exchange material separated by a permeable diaphragm, passing a direct current from a first electrode adjacent said bed of anion exchange material first through said bed of anion exchange material and then through said bed of cation exchange material to a second electrode adjacent said bed of cation exchange material so that said first electrode is an anode and said second electrode is a cathode, whereby anions entering said bed of cation exchange material with said solution migrate into said bed of anion exchange material and along with anions entering said bed of anion exchange material with said solution replace hydroxyl anions in said bed of anion exchange material and cations entering said bed of anion exchange material with said solution migrate into said bed of cation exchange material and along with cations entering said bed of cation exchange material with said solution replace hydrogen cations in said bed of cation exchange material, and regenerating said ion exchange materials by reversing the direction of current flow between said electrodes so that said first electrode now becomes a cathode and said second electrode now becomes an anode whereby hydroxyl anions are produced at said first electrode to replace other anions in said anion exchange material and hydrogen cations are produced at said second electrode to replace other cations in said cation exchange material.

3. The process of deionizing water containing a dissolved electrolyte, which comprises, flowing portions of said water in parallel through adjacent beds of particles of active anion exchange resin and active cation exchange resin separated by a permeable diaphragm, and passing a direct current from a first electrode adjacent said bed of anion exchange resin first through said bed of anion exchange resin and then through said bed of cation exchange resin to a second electrode adjacent said bed of cation exchange resin so that said first electrode is an anode and said second electrode is a cathode, whereby anions carried into said bed of cation exchange resin in said water migrate into said bed of anion exchange resin and along with anions carried into said bed of anion exchange resin in said water replace hydroxyl anions in said bed of anion exchange resin and cations carried into said bed of anion exchange resin migrate into said bed of cation exchange resin and along with cations carried into said bed of cation exchange resin in said water replace hydrogen cations in said bed of cation exchange resin.

4. The process of deionizing water containing a dissolved electrolyte, which comprises, flowing portions of said water in parallel through adjacent beds of particles of active anion exchange resin and active cation exchange resin separated by a permeable diaphragm, passing a direct current from a first electrode adjacent said bed of anion exchange resin first through said bed of anion exchange resin and then through said bed of cation exchange resin to a second electrode adjacent said bed of cation exchange resin so that said first electrode is an anode and said second electrode is a cathode, whereby anions carried into said bed of cation exchange resin in said water migrate into said bed of anion exchange resin and along with anions carried into said bed of anion exchange resin in said water replace hydroxyl anions in said bed of anion exchange resin and cations carried into said bed of anion exchange resin migrate into said bed of cation exchange resin and along with cations carried into said bed of cation exchange resin in said water replace hydrogen cations in said bed of cation exchange resin, and regenerating said ion exchange resins by reversing the direction of current flow between said electrodes so that said first electrode now becomes a cathode and said second electrode now becomes an anode whereby hydroxyl anions produced at said first electrode replace other anions in said bed of anion exchange resin and hydrogen cations produced at said second electrode replace other cations in said bed of cation exchange resin.

5. The process as defined in claim 4 in which the flow of water is decreased during the regeneration of said ion exchange resins and a solution of said electrolyte more concentrated than the original water being treated is discharged during said regeneration.

6. Apparatus for removing an electrolyte from a solution thereof in a solvent in which it ionizes, which comprises, a container, a permeable diaphragm separating said container into an anion exchange compartment and a cation exchange compartment, a bed of particles of anion exchange material in said anion exchange compartment, a bed of particles of cation exchange material in said cation exchange compartment, a first electrode positioned in said anion exchange compartment on the side of said bed of anion exchange material opposite said diaphragm, a second electrode positioned in said cation exchange compartment on the side of said bed of cation exchange material opposite said diaphragm, conduit means for flowing portions of said solution in parallel through the beds in said compartments between said electrodes and said diaphragm, and electrical connections to said electrodes for flowing a direct current through said beds and diaphragm from said first electrode to said second electrode to cause anions in said solution entering said cation exchange compartment to migrate into said anion exchange compartment and replace hydroxyl anions in said anion exchange material and cause cations in said solution entering said anion exchange compartment to migrate into said cation exchange compartment and replace hydrogen cations in said cation exchange material.

7. Apparatus for removing an electrolyte from a solution thereof in a solvent in which it ionizes, which comprises, a container, a permeable diaphragm separating said container into an anion exchange compartment and a cation exchange compartment, a bed of particles of anion exchange material in said anion exchange compartment, a bed of particles of cation exchange material in said cation exchange compartment, a first electrode positioned in said anion exchange compartment on the side of said bed of anion exchange material opposite said diaphragm, a second electrode positioned in said cation exchange compartment on the side of said bed of cation exchange material opposite said diaphragm, conduit means for flowing portions of said solution in parallel through the beds in said compartments between said electrodes and said diaphragm, electrical connections to said electrodes for flowing a direct current through said beds and diaphragm from said first electrode to said second electrode to cause anions in said solution entering said cation exchange compartment to migrate into said anion exchange compartment and replace hydroxyl anions in said anion exchange material and cause cations in said solution entering said anion exchange compartment to migrate into said cation exchange compartment and replace hydrogen cations in said cation exchange material, and means for reversing the direction of current flow between said electrodes to regenerate said resins.

8. The process of deionizing water containing a dissolved electrolyte, comprising, flowing portions of said water in parallel through adjacent beds of active anion and cation exchange materials separated by a permeable diaphragm, and passing a direct current from a first electrode adjacent said bed of anion exchange material through said bed of anion exchange material and through said bed of cation exchange material to a second electrode adjacent said bed of cation exchange material so that said first electrode is an anode and said second electrode is a cathode.

9. The process of deionizing water containing a dissolved electrolyte, comprising, flowing portions of said water in parallel through adjacent beds of active anion and cation exchange materials separated by a permeable diaphragm, passing a direct current from a first electrode adjacent said bed of anion exchange material through said bed of anion exchange material and through said bed of cation exchange material to a second electrode adjacent said bed of cation exchange material so that said first electrode is an anode and said second electrode is a cathode, and regenerating said ion exchange materials by reversing the direction of current flow between said electrodes so that said first electrode now becomes a cathode and said second electrode now becomes an anode.

10. Apparatus for deionizing water containing a dissolved electrolyte, comprising, a container, a permeable diaphragm separating said container into an ion exchange compartment and a cation exchange compartment, a bed of particles of anion exchange material in said anion exchange compartment, a bed of particles of cation exchange material in said cation exchange compartment, a first electrode positioned in said anion exchange compartment on the side of said bed of anion exchange material opposite said diaphragm, a second electrode positioned in said cation exchange compartment on the side of said bed of said cation exchange material opposite said diaphragm, conduit means for flowing portions of said water in parallel through said beds, and electrical connections to said electrodes.

References Cited in the file of this patent

UNITED STATES PATENTS

| | | |
|---|---|---|
| 2,057,232 | Endell | Oct. 13, 1936 |
| 2,502,614 | Zender | Apr. 4, 1950 |
| 2,636,852 | Juda et al. | Apr. 28, 1953 |

FOREIGN PATENTS

| | | |
|---|---|---|
| 491,073 | Belgium | Sept. 12, 1949 |

OTHER REFERENCES

"Kolloid Zeitschrift," vol. 112 (1949), pp. 21–26, Kalauch.

"Science," vol. 113, No. 2941, May 11, 1951, pp. 546–7.